(12) United States Patent
Golchert et al.

(10) Patent No.: US 12,503,528 B2
(45) Date of Patent: Dec. 23, 2025

(54) THERMOPLASTIC MOULDING COMPOSITION WITH IMPROVED WEATHERING RESISTANCE

(71) Applicant: Röhm GmbH, Darmstadt (DE)

(72) Inventors: Ursula Golchert, Dieburg (DE); Stefan Nau, Buettelborn (DE); Ernst Becker, Bensheim (DE)

(73) Assignee: Röhm GmbH, Darmstadt (DE)

( * ) Notice: Subject to any disclaimer, the term of this patent is extended or adjusted under 35 U.S.C. 154(b) by 537 days.

(21) Appl. No.: 18/001,085

(22) PCT Filed: Jun. 9, 2021

(86) PCT No.: PCT/EP2021/065386
§ 371 (c)(1),
(2) Date: Dec. 8, 2022

(87) PCT Pub. No.: WO2021/250053
PCT Pub. Date: Dec. 16, 2021

(65) Prior Publication Data
US 2023/0212333 A1 Jul. 6, 2023

(30) Foreign Application Priority Data

Jun. 10, 2020 (EP) .................................... 20179124

(51) Int. Cl.
*C08F 20/14* (2006.01)
*C08K 3/04* (2006.01)
*C08K 5/23* (2006.01)
*C08K 5/3417* (2006.01)

(52) U.S. Cl.
CPC ............... *C08F 20/14* (2013.01); *C08K 3/04* (2013.01); *C08K 5/23* (2013.01); *C08K 5/3417* (2013.01)

(58) Field of Classification Search
None
See application file for complete search history.

(56) References Cited

U.S. PATENT DOCUMENTS

| 2011/0136964 A1* | 6/2011 | Golchert .................. C08K 5/01 524/502 |
| 2012/0157587 A1 | 6/2012 | Meyer et al. |
| 2013/0096244 A1 | 4/2013 | Schwarz-Barac et al. |
| 2015/0322240 A1 | 11/2015 | Golchert et al. |
| 2016/0222185 A1 | 8/2016 | Bockmann et al. |

FOREIGN PATENT DOCUMENTS

| EP | 0 841 186 | 5/1998 |
| EP | 0 841 187 | 5/1998 |
| GB | 1409275 A | * 10/1975 ............. C08L 55/02 |
| JP | 2013-14661 A | 1/2013 |
| JP | 2016-37518 | 3/2016 |
| WO | 2012/080397 | 6/2012 |
| WO | 2015/036526 | 3/2015 |
| WO | 2020/016371 | 1/2020 |

OTHER PUBLICATIONS

Golchert et al., U.S. Appl. No. 18/001,066, filed Dec. 7, 2022.
International Search Report for PCT Application No. PCT/EP2021/065386, mailed on Aug. 18, 2021, 4 pages.
International Preliminary Report dated May 23, 2022, for PCT Application No. PCT/EP2021/065386, 17 pages.
Written Opinion for PCT Application No. PCT/EP2021/065386, mailed on Aug. 18, 2021, 7 pages.

* cited by examiner

*Primary Examiner* — Katarzyna I Kolb
(74) *Attorney, Agent, or Firm* — Grüneberg and Myers PLLC

(57) ABSTRACT

A thermoplastic moulding composition has improved weathering resistance. A process for producing the thermoplastic moulding composition involves providing a thermoplastic polymer and adding at least one colouring preparation. Injection moulded parts and extruded parts can be composed of the thermoplastic moulding composition.

18 Claims, No Drawings

THERMOPLASTIC MOULDING COMPOSITION WITH IMPROVED WEATHERING RESISTANCE

CROSS-REFERENCE TO RELATED APPLICATIONS

This application is the National Stage entry under § 371 of International Application No. PCT/EP2021/065386, filed on Jun. 9, 2021, and which claims the benefit of priority to European Application No. 20179124.1, filed on Jun. 10, 2020. The content of each of these applications is hereby incorporated by reference in its entirety.

BACKGROUND OF THE INVENTION

Field of the Invention

The present invention relates to a thermoplastic moulding composition with improved weathering resistance and a process for production thereof. The invention further relates to injection moulded parts and extruded parts composed of said thermoplastic moulding composition.

Description of Related Art

Thermoplastic polymers such as polymethyl methacrylate (PMMA), polyesters, polycarbonates and polyamides are commonly coloured with various soluble organic dyes, and, optionally, organic or inorganic pigments. Typically, perinone-, azo- and anthraquinone-type solvent dyes are used for this purpose due to their commercial availability and bright colours. The term "soluble" as used in the present application indicates that the dye is soluble in the matrix of the thermoplastic polymer in amounts in which it is used for colouring. Accordingly, the term "thermoplastic moulding composition" as used in the present application refers to a thermoplastic composition comprising carbon black and an organic dye which are uniformly distributed in the matrix of the thermoplastic polymer.

Moulding compositions for outdoor applications are exposed to significant amounts of solar UV radiation and increased temperatures and therefore need to have a sufficient weathering stability. A long-term weathering stability of a thermoplastic moulding composition depends not only on the inherent stability of the underlying thermoplastic polymer but also on various polymer additives such as organic dyes, if present, organic or inorganic pigments, as well as UV absorbers, UV stabilizers etc.

Moulding compositions for various outdoor applications are often coloured in black or greyish colours for aesthetic reasons. Such moulding compositions typically comprise a combination of carbon black and at least one soluble organic dye, commonly a red dye. Such combination is known to confer the resulting compositions an aesthetically appealing appearance.

Due to presence of carbon black, black or greyish thermoplastic moulding compositions tend to absorb considerable amounts of solar infrared (IR) radiation and may reach temperatures of 60° C. or even more in outdoor applications. A combination of solar UV radiation and increased temperatures is particularly detrimental for moulding compositions and commonly leads to undesired discoloration effects, e.g. yellowing of the polymeric material and decomposition of soluble organic dyes overtime. Accordingly, there is a strong demand for weathering resistant black or greyish thermoplastic moulding compositions for use in outdoor applications.

WO 2012/080397 A2 describes glazing materials which exhibit high transmission in the visible range and low transmission in the IR range. These materials comprise
  a. at least one transparent thermoplastic plastic
  b. at least one inorganic IR absorber
  c. nano-scale carbon black, and
  d. at least one colouring agent.

WO 2012/080397 A2 suggests using a perinone dye MACROLEX® Red EG (Solvent Red 135) as a red colouring agent in combination with Paliogen® Blue L 6385 (Pigment Blue 60) as a blue colouring agent. The document reports that the obtained materials have a high weathering resistance.

WO 2015/036526 A1 describes a black thermoplastic moulding composition with high gloss, comprising
  a. from 90 to 99.5% by weight of one or more styrene copolymers
  b. from 0.01 to 5% by weight of a carbon black pigment
  c. from 0.1 to 1.5% by weight of at least two dyes soluble in the moulding composition
  d. from 0 to 5% by weight of one or more additional substances.

The composition is reported to have a deep-black colour with $L^*$-values from 0.5 to 2.0, measured in accordance with DIN 5033, and a high gloss of more than 98, measured in accordance with DIN 67530.

JP 2016-037518 A discloses a jet-black coloured methacrylic resin moulding composition having a high weathering resistance and shielding properties. The composition normally comprises three or more dyes selected from the group consisting of red, yellow, green, blue and violet dyes. The dyes can be selected from anthraquinone dyes, heterocyclic compound dyes and perinone dyes.

JP 2016-037518 A suggests using red dyes such as Solvent Red 52, 111, 135, 145, 146, 149, 150, 151, 155, 179, 180, 181,196, 197, 207, Disperse Red 22, 60, 191 and the like. Examples of the blue dyes include Solvent Blue 35, 45, 78, 83, 94, 97, 104, 105. Examples of suitable yellow dyes include Disperse Yellow 160, 54, 160, and Solvent Yellow 33. Examples of green dyes include, for example, Solvent Green 3, 20, and 28 etc. Examples of purple dyes include, for example, Solvent Violet 28, 13, 31, 35, and 36.

Commercially available monoazo dyes comprising at least one heteroaromatic moiety have not been used in combination with carbon black for colouring of thermoplastic polymers such as polyalkyl (meth)acrylates until now. This is because monoazo solvent dyes have been found to have only a moderate thermal and weathering stability and therefore moulding compositions comprising a combination of any monoazo solvent dye and carbon black have been expected to be unsuitable for outdoor use.

Insufficient weathering stability of a coloured moulding composition often leads to undesired colour changes upon exposure to solar radiation. Therefore, weathering stability of a given moulding composition can often be estimated by measuring the colours in the CIELAB colour space of a sample of such moulding composition before and after exposing it to a weathering test. The colour difference, i.e. the difference between these two colours can serve as an indicator for the weathering stability.

SUMMARY OF THE INVENTION

It has therefore been an object of the present invention to provide a novel grey or black coloured thermoplastic composition having an improved long-term heat and weathering stability, an aesthetically pleasing appearance and high gloss. It was further desired that said moulding composition retains its advantageous optical properties, even upon exposure to increased temperatures and/or high shearing forces, e.g. during injection moulding of parts having a complex geometrical shape.

A further object of the invention was provision of a process for production of grey or black coloured thermoplastic compositions having an improved long-term heat and weathering stability in a particularly efficient manner.

Finally, the invention aimed to provide grey or black coloured moulded parts, in particular those having a complex geometrical shape having these advantageous properties.

The present invention is based on a surprising finding that a thermoplastic moulding composition comprising a monoazo dye comprising at least one heteroaromatic moiety in combination with carbon black has a significantly higher long-term heat and weathering stability than comparable moulding compositions comprising other types of dyes such as e.g. commonly used perinone-based dyes. Since the monoazo dyes with at least one heteroaromatic moiety have an excellent solubility in the employed thermoplastic polymer, a complete and uniform dissolution in the polymer matrix takes place and the resulting thermoplastic moulding composition has excellent optical properties, low haze, high gloss and an aesthetically pleasing appearance.

Accordingly, in its first aspect, the present invention is directed to a thermoplastic moulding composition comprising:
 a) from 90.0 to 99.99989 wt.-% of a thermoplastic polymer;
 b) from 0.0001 to 5.0 wt.-% of carbon black; and
 c) from 0.00001 to 5.0 wt.-% of a monoazo dye comprising at least one heteroaromatic moiety.

Additionally, the present invention provides a process for the manufacturing of a thermoplastic moulding composition as defined above, wherein the process comprises the following steps:
 a) providing a thermoplastic polymer; and
 b) adding to the thermoplastic polymer from step a) at least one colouring composition, comprising carbon black and a monoazo dye comprising at least one heteroaromatic moiety, wherein said colouring composition is preferably a liquid composition or a masterbatch.

DETAILED DESCRIPTION OF THE INVENTION

Monoazo dyes for use in the present invention as such are well-known to a skilled person and are derivatives of diazene (diimide), HN=NH, wherein both hydrogens are substituted by aromatic or heteroaromatic moieties, (IUPAC Recommendations 1995, published in Pure & Appl. Chem., Vol. 67, No. 819, pp. 1307-1375, 1995) In other words, chemical structures of all monoazo dyes comprise one chemical moiety —N=N—.

The term "heteroaromatic moiety" as used in the present application is also well-known and typically refers to a 5- or 6-membered aromatic moiety comprising at least one heteroatom in its structure. Normally, the heteroatom is an N, O, S, Se or Te atom, more preferably an N, O or S atom, and still more preferably an N atom. Specific examples of the heteroaromatic moiety include, for example, furan, thiophene, pyran, pyrrole, imidazole, pyrazole, 3H-pyrazol-3-one, pyrazolin-5-one, pyridine, pyrazine, pyrimidine, pyridazine, thiazole, oxazole, isothiazole, isoxazole, thiadiazole, oxadiazole, triazole, selenazole and tellurazole. Further examples of the heteroaromatic moiety include, for example, indolizine, purine, pteridine, carboline, pyrroloimidazole, pyrrolotriazole, pyrazoloimidazole, pyrazolotriazole, pyrazolopyrimidine, pyrazolotriazine, triazolopyridine, tetrazaindene, imidazoimidazole, imidazopyridine, imidazopyrazine, imidazopyrimidine, imidazopyridazine, oxazolopyridine, oxazolopyrazine, oxazolopyrimidine, oxazolopyridazine, thiazolopyridine, thiazolopyrazine, thiazolopyrimidine, thiazolopyridazine, pyridinopyrazine, pyradinopyrazine, pyradinopyridazine, naphthyridine, imidazotriazine and 1H-perimidin.

The heteroaromatic moiety is normally substituted by one or several substituents which may be alkyl, alkenyl, alkynyl, aryl, amino, alkoxyl, aryloxy, acyl, alkoxycarbonyl, aryloxycarbonyl, acyloxy, acylamino, alkoxycarbonylamino, aryloxycarbonylamino, sulfonylamino, sulfamoyl, -carbamoyl, alkylthio, arylthio, sulfonyl, cyano and heterocyclic groups and halogen atoms. More preferable are alkyl, alkenyl, aryl, alkoxyl, aryloxy, cyano and heterocyclic groups and halogen atoms, still more preferably alkyl, aryl, alkoxyl, aryloxy and aromatic heterocyclic groups, and particularly preferably are alkyl, aryl, alkoxyl and aromatic heterocyclic groups.

Specific examples of monoazo dyes for use in the present invention include but are not limited to
 Disperse Yellow 241 (5-[(3,4-dichlorophenyl)azo]-1,2-dihydro-8-hydroxy-1,4-dimethyl-2-oxonicotinonitrile),
 Solvent Black 3 (2,3-dihydro-2,2-dimethyl-8-((4-(phenylazo)-1-naphthyl)azo)-1H-perimidin),
 Solvent Red 195 (cyano-5-[[5-cyano-2,6-bis[(3-methoxypropylamino]-4-methylpyridin-3-yl]azo]-3-methyl-2-thiophenecarboxylic acid methyl ester),
 Solvent Yellow 16 (5-methyl-2-phenyl-4-phenylazo-4H-pyrazol-3-one),
 Solvent Yellow 18 (4-[(2,4-dimethylphenylazo]-2,4-dihydro-5-methyl-2-phenyl-3H-pyrazol-3-one),
 Solvent Yellow 21 (3-[(1-oxonaphthalen-2-ylidene)methylhydrazinylidene]-1-prop-2-enylindol-2-one),
 Solvent Yellow 72 (4-((o-methoxyphenyl)azo)-3-methyl-1-phenyl-2-pyrazolin-5-one),
 Solvent Yellow 82, Solvent Yellow 16 (5-methyl-2-phenyl-4-phenylazo-4H-pyrazol-3-one).

In one preferred embodiment of the invention, the monoazo dye is Solvent Red 195. Thermoplastic moulding compositions comprising Solvent Red 195 in combination with carbon black surprisingly have, in addition to an aesthetically appealing appearance, a significantly higher weathering stability and thermal stability than comparable polyalkyl (meth)acrylate-based moulding compositions with other red solvent dyes of the prior art such as e.g. red perinone dyes. Hence, it is advantageous that the thermoplastic moulding compositions of the present invention comprising Solvent Red 195 contain substantially no other red solvent dyes. Red solvent dyes within the meaning of the present invention are those designated as Solvent Red, Acid Red or Modern Red according to the colouring index (C.I.). In particular, the thermoplastic moulding compositions of the present invention comprising Solvent Red 195 normally comprise less than 0.1 wt.-%, more preferably less than 0.01 wt.-%, even more preferably less than 0.001 wt.-%, yet even more preferably less than 0.0001 wt.-%, still more preferably less than 0.00001 wt.-%, most preferably less than 0.000001 wt.-% of other red solvent dyes, based on the weight of the thermoplastic moulding composition.

The concentration of the monoazo dye comprising at least one heteroaromatic moiety in the thermoplastic moulding composition depends on the desired perceived colour. The concentration is generally in the range from 0.00001 to 5.0 wt.-% preferably from 0.0001 to 4.0 wt.-%, more preferably from 0.001 to 3.0 wt.-%, based on the weight of the thermoplastic moulding composition. If further dyes are present, the sum of the dye concentrations is preferably in the range from 0.00001 to 5.0 wt.-% preferably from 0.0001 to 4.0 wt.-%, more preferably from 0.001 to 3.0 wt.-%, based on the weight of the thermoplastic moulding composition.

In order to impart the moulding composition black or greyish colours at least one kind of carbon black is used. Average primary particle size of carbon black pigment is normally in the range from 5.0 to 100.0 nm, more preferably from 7.0 to 60.0 nm. Average particle size $d_{50}$ can be determined by a method known to a skilled person, e.g. by photon correlation spectroscopy according to the standard DIN ISO 13320 (1999) upon using a commercially available instrument such as LS 13 320 Laser Diffraction Particle Size Analyzer from Beckman Coulter Inc. It further showed to be advantageous in terms of colouring performance to select carbon black particles having a specific surface area, measured by BET method, standard ISO 9277, of from 50 to 500 $m^2/g$, for instance from 70 to 200 $m^2/g$. The carbon black can be treated or untreated. For example, the carbon black can be treated with specific gases or organic substances, such as, for example, butyllithium. Such treatment allows the surface to be modified or functionalised. This can additionally promote compatibility with the correspondingly used polymeric matrix.

Carbon blacks suitable within the scope of the invention differ from so-called conductive blacks in that they have only low or no electrical conductivity. Compared with the carbon blacks used here, conductive blacks have specific morphologies and superlattices in order to achieve high conductivity. By contrast, carbon black particles used here can very readily be dispersed in thermoplastics so that virtually no cohesive regions of carbon black occur, from which a corresponding conductivity might result. Suitable carbon blacks within the scope of the invention which are obtainable commercially under a large number of trade names and in a large number of forms, such as pellets or powder. For example, suitable carbon blacks are obtainable under the trade names BLACK PEARLS®, in the form of wet-processed pellets under the names ELFTEX®, REGAL® and CSX®, and in a flocculent form under the names MONARCH®, ELFTEX®, REGAL® and MOGUL®—all obtainable from Cabot Corporation. Printex® 60, and Printex® 90 (Orion Engineered Carbons GmbH) are also suitable for this purpose.

The concentration of carbon black in the thermoplastic moulding composition mainly depends on the desired L*-value in CIELAB 1976 colour space. The concentration is preferably in the range from 0.0001 to 5.0 wt.-% preferably from 0.001 to 4.0 wt.-%, more preferably from 0.005 to 3.0 wt.-%, also preferably from 0.001 to 2 wt.-%, also preferably 0.01 to 1 wt.-%, based on the weight of the thermoplastic moulding composition.

In addition to the monoazo dye comprising at least one heterocyclic moiety and carbon black, the thermoplastic moulding composition of the present invention may further comprise
- at least one further dye selected from perinone dye, quinophthalone dye and anthraquinone dye;
- at least one phthalocyanine pigment; or
- any mixture of the above.

As readily understood by a skilled colourist, the nature of these dyes which preferably cover complementary colour regions is typically selected in such a way that their combination produces a black colour. An example of the simple combination giving a black colour is a red monoazo dye comprising at least one heteroaromatic moiety and its complementary green dye. Green solvent dyes within the meaning of the present invention are those designated as Solvent Green, Acid Green or Modern Green according to the colouring index (C.I.). By way of example the dye Solvent Red 195 can be used in combination with the known dye Solvent Green 28 to achieve a black coloration. It is also possible in the invention to use a combination of a yellow monoazo dye comprising at least one heteroaromatic moiety with a complementary blue dye to produce black colour. An example of such combination would be a combination of Solvent Yellow 82 with Solvent Blue 104, both of which are known per se.

Furthermore, if a glossy jet-black appearance is desired, the thermoplastic moulding composition of the invention may advantageously comprise at least three different dyes which cover complementary colour regions. It is thus possible to avoid undesired shades of the black colour or to adjust these in the desired direction. An example is the combination of Solvent Red 195 with Solvent Green 28 and Solvent Yellow 114. Yellow solvent dyes within the meaning of the present invention are those designated as Solvent Yellow, Acid Yellow or Modern Yellow according to the colouring index (C.I.). A combination of the red monoazo dye Solvent Red 195 with the yellow dye Solvent Yellow 114 and the green dye Solvent Green 28 is a further example of a combination with advantageous properties.

Anthraquinone dyes are dyes having an anthraquinone moiety in their structure. Examples of suitable anthraquinone dyes include (colour index C.I.) Solvent Yellow 117, 163, 167, 189; Solvent Orange 77, 86; Solvent Red 111, 143, 145, 146, 150, 151, 155, 168, 169, 172, 175, 181, 207, 222, 227, 230, 245, 247; Solvent Violet 11, 13, 14, 26, 31, 36, 37, 38, 45, 47, 48, 51, 59, 60; Solvent Blue 14, 18, 35, 36, 45, 58, 59, 59:1, 63, 68, 69, 78, 79, 83, 94, 98, 100, 101, 102, 104, 105, 111, 112, 122, 128, 132, 136, 139; Solvent Green 3, 28, 29, 32, 33; Acid Red 80; Acid Green 25, 27, 28, 41; Acid Violet 34; Acid Blue 25, 27, 40, 45, 78, 80, 112; Disperse Yellow 51; Disperse Violet 26, 27; Disperse Blue 1, 14, 56, 60; Direct Blue 40; Modern Red 3, 11; Modern Blue 8.

Examples of perinone dyes which are suitable for use in the present invention include (colour index C.I.) Solvent Orange 60, 78, 90; Solvent Red 135, 162, 179; Solvent Violet 29 and the like.

Suitable quinophthalone dyes include (colour index C.I.) Solvent Yellow 33, 114, 128, 129, Disperse Yellow 14, 49, 54 and the like.

Phthalocyanine pigments for use in the present invention are not particularly limited and include inter alia metal-free phthalocyanines, cobalt phthalocyanines, copper phthalocyanines, nickel phthalocyanines, iron phthalocyanines, manganese phthalocyanines and zinc phthalocyanines. Thermoplastic moulding compositions comprising copper phthalocyanines showed to have particularly high thermal and weathering resistance and a strong colour depth. Suitable copper phthalocyanine pigments may be selected from e.g. Pigment Blue 1, 2, 15, 15:1, 15:2, 15:3, 15:4, 15:6, 16, 17:1, 56, 60, and 63 as well as Pigment Green 7 and 36.

The thermoplastic moulding composition of the present invention may also comprise at least one inorganic pigment.

The inorganic pigment may be, for instance, selected from barium sulphate, zinc oxide, iron oxides, magnesium titanate, calcium sulphate, calcium carbonate, magnesium carbonate, titanium dioxide, carbon black and dolomite.

The choice of the thermoplastic polymer for use in the present invention is not particularly limited, as long as the thermoplastic polymer is suitable for colouring and thermoplastic processing, in particular for injection moulding and extrusion. For instance, thermoplastic polymer may be advantageously selected from the group consisting of polyalkyl (meth)acrylate, polymethylmethacrylimide, polyalkyl (meth)acrylate copolymers, polystyrene, polystyrene copolymer, acrylonitrile copolymers, polycarbonates, polyesters, preferably polyethylene terephthalate, polyamides, polyvinylidene fluoride or a mixture thereof.

Preferably, the thermoplastic polymer is selected from the group consisting of polyalkyl (meth)acrylate, polymethylmethacrylimide, polyalkyl (meth)acrylate copolymers, polystyrene, polystyrene copolymer, acrylonitrile copolymers, polycarbonates, polyesters (preferably polyethylene terephthalate), polyvinylidene fluoride or a mixture thereof. More preferably, the thermoplastic polymer is selected from the group consisting of polyalkyl (meth)acrylate, polymethylmethacrylimide, polyalkyl (meth)acrylate copolymers, polycarbonates, or a mixture thereof.

Preferably, the thermoplastic polymer as such is substantially transparent before being coloured. The term "substantially transparent" as used in the present application refers to a material having a transmittance ($D_{65}$) of at least 50%, preferably at least 60%, more preferably at least 70%, even more preferably at least 80% and particularly preferably at least 90%, determined on a sample with a thickness of 2.0 mm according to the standard ISO 13488-2 (2006).

Polyalkyl (Meth)Acrylates

Polyalkyl (meth)acrylates are usually obtained by free-radical polymerization of mixtures which typically comprise an alkyl (meth)acrylate, typically methyl methacrylate (a), and at least one further (meth)acrylate (b). These mixtures generally comprise at least 50 wt.-%, preferably at least 60 wt.-%, particularly preferably at least 80 wt.-%, and even more preferably at least 90 wt.-%, based on the weight of the monomers, of methyl methacrylate (a). The amount of methyl methacrylate (a) generally used is from 50.0 wt.-% to 99.9 wt.-%, preferably from 80.0 wt.-% to 99.9 wt.-% and particularly preferably from 90.0 wt.-% to 99.9 wt.-%, based on the weight of monomers.

These mixtures for production of polyalkyl (meth)acrylates can also comprise other (meth)acrylates (b) copolymerizable with methyl methacrylate (a). The term "(meth) acrylate" as used herein is meant to encompass methacrylates, acrylates and mixtures thereof. (Meth)acrylates may derive from saturated alcohols, e.g. methyl acrylate, ethyl (meth)acrylate, propyl (meth)acrylate, n-butyl (meth)acrylate, tert-butyl (meth)acrylate, isobutyl (meth) acrylate, pentyl (meth)acrylate and 2-ethylhexyl (meth)acrylate; or from unsaturated alcohols, e.g. oleyl (meth)acrylate, 2-propynyl (meth)acrylate, allyl (meth)acrylate, vinyl (meth)acrylate; and also aryl (meth)acrylates, such as benzyl (meth)acrylate or phenyl (meth)acrylate, cycloalkyl (meth) acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth) acrylate, 2-hydroxyethyl (meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; amides and nitriles of (meth)acrylic acid etc.

The amount of the (meth)acrylic comonomers (b) generally used is from 0.1 wt.-% to 50.0 wt.-%, preferably from 1.0 wt.-% to 20.0 wt.-% and particularly preferably from 1.0 wt.-% to 10.0 wt.-%, based on the weight of monomers, and the compounds here can be used individually or in the form of a mixture.

The polymerization reaction is generally initiated by known free-radical initiators. Among the preferred initiators are inter alia the azo initiators well known to persons skilled in the art, as well as peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, or mixtures thereof as example.

The compositions to be polymerized can comprise not only the methyl methacrylate (a) and the (meth)acrylates (b) described above but also other unsaturated monomers which are copolymerizable alone or by employing other monomers that facilitate copolymerization with methyl methacrylate and with the above mentioned (meth)acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, maleic acid derivatives, such as maleic anhydride, methylmaleic anhydride, maleimide, methylmaleimide; and dienes, such as divinylbenzene.

The amount of these comonomers (c) generally used is from 0.0 wt.-% to 35.0 wt.-%, preferably from 0.0 wt.-% to 30.0 wt.-% and particularly preferably from 0.0 wt.-% to 25.0 wt.-%, based on the weight of monomers, and the compounds here can be used individually or in the form of a mixture.

Further preference is given to polyalkyl (meth)acrylates which are obtainable by polymerization of a composition having, as polymerizable constituents:
(a) from 50.0 wt.-% to 99.9 wt.-% of methyl methacrylate
(b) from 0.1 wt.-% to 50.0 wt.-% of an acrylic acid ester of a C1-C4 alcohol
(c) from 0.0 wt.-% to 35.0 wt.-% of monomers co-polymerizable with the monomers (a) and (b).

In yet a further embodiment, preference is given to polyalkyl (meth)acrylates composed of from 85.0 wt.-% to 99.5 wt. % of methyl methacrylate and from 0.5 wt.-% to 15.0 wt.-% of methyl acrylate, the amounts here being based on 100 wt.-% of the polymerizable constituents. Particularly advantageous copolymers are those obtainable by copolymerization of from 90.0 wt.-% to 99.5 wt.-% of methyl methacrylate and from 0.5 wt.-% to 10.0 wt.-% of methyl acrylate, where the amounts are based on 100 wt.-% of the polymerizable constituents. For instance, the polyalkyl (meth)acrylates may comprise 91.0 wt.-% of methyl methacrylate and 9.0 wt.-% of methyl acrylate, 96.0 wt.-% of methyl methacrylate and 4.0 wt.-% of methyl acrylate or 99.0 wt.-% of methyl methacrylate and 1.0 wt.-% of methyl acrylate. The Vicat softening points VSP (ISO 306: 2013, method B50) of said polyalkyl (meth)acrylates is typically at least 90° C., preferably from 95° C. to 112° C.

The weight average molecular mass Mw of the polyalkyl (meth)acrylates is generally in the range from 50 000 g/mol to 300 000 g/mol. Particularly advantageous mechanical properties are obtained with polyalkyl (meth)acrylates having an average molecular weight Mw in the range from 50 000 g/mol to 200 000 g/mol, preferably from 80 000 g/mol to 180 000 g/mol, in each case determined by means of GPC against PMMA calibration standards and THF as an eluent.

In a particularly preferred embodiment, the polyalkyl (meth)acrylate is obtainable by polymerization of a composition whose polymerizable constituents comprise, based on the weight of the polymerizable composition:
(a) from 80.0 wt.-% to 99.9 wt.-% of methyl methacrylate, and
(b) from 0.1 wt.-% to 20.0 wt.-% of an acrylic acid ester of a C1-C4 alcohol.

Corresponding copolymers are e.g. commercially available under the trademark PLEXIGLAS® from Röhm GmbH.

Poly(Meth)Acrylimides

The poly(meth)acrylimide (PMMI) which may be used in the present invention comprises at least 25 wt.-%, preferably at least 50 wt.-%, most preferably at least 70 wt.-%, based on the weight of the poly(meth)acrylimide, of repeating units of Formula (I):

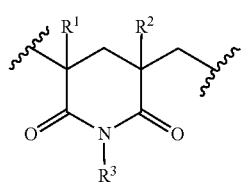

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group.

Production processes for PMMI are disclosed by way of example in EP-A 216 505, EP-A 666 161 or EP-A 776 910, the entire disclosure of which is incorporated herein by reference.

The starting material used for production of PMMI comprises a polymer derived from alkyl esters of methacrylic acid and generally composed of more than 50.0 wt.-%, preferably of more than 80.0 wt.-%, particularly preferably of from 95.0 wt.-% to 100.0 wt.-%, of units of alkyl esters of methacrylic acid having from 1 to 4 carbon atoms in the alkyl radical. Methyl methacrylate is preferred. Preferred polymers are composed of at least 80.0 wt.-%, preferably of more than 90.0 wt.-%, more preferably of more than 95.0 wt.-%, still more preferably of more than 99.0 wt.-% of methyl methacrylate, wherein use of neat methyl methacrylate is most preferable. Comonomers that can be used comprise any of the monomers copolymerizable with methyl methacrylate, in particular alkyl esters of acrylic acid having from 1 to 4 carbon atoms in the alkyl radical, acrylo- or methacrylonitrile, acryl or methacrylamide, styrene, or else maleic anhydride. Preference is given to thermoplastically processable polymers of this type whose reduced viscosity is in the range from 20 ml/g to 92 m/g, preferably from 50 ml/g to 80 ml/g (measured to ISO 8257 (2006), Part 2). They are used in the form of powder or pellets whose median particle size is from about 0.03 mm to 3 mm.

Typically, PMMIs for use in the present invention have a mass average molar weight Mw of from 80 000 g/mol to 200 000 g/mol, preferably from 90 000 g/mol to 150 000 g/mol, determined by GPC using PMMA as a standard. Such materials are commercially available from Röhm GmbH under the trademark PLEXIMID®. Suitable products include but are not limited to PLEXIMID® TT50, PLEXIMID® TT70, PLEXIMID® 8805, PLEXIMID® 8813, PLEXIMID® 8817, commercially available from Röhm GmbH.

Polycarbonates

Polycarbonates may also be used as thermoplastic polymers in the process of the present invention. Polycarbonates can be considered formally as polyesters formed from carbonic acid and aliphatic or aromatic dihydroxyl compounds. They are readily obtainable by reacting diglycols or bisphenols with phosgene or carbonic diesters, by polycondensation or transesterification reactions.

Preference is given to polycarbonates which derive from bisphenols. These bisphenols include especially 2,2-bis(4-hydroxyphenyl)propane (bisphenol A), 2,2-bis(4-hydroxyphenyl)butane (bisphenol B), 1,1 bis(4-hydroxyphenyl)cyclohexane (bisphenol C), 2,2'-methylenediphenol (bisphenol F), 2,2-bis(3,5-dibromo-4 hydroxyphenyl)propane (tetrabromobisphenol A) and 2,2-bis(3,5 dimethyl-4-hydroxyphenyl)propane (tetramethylbisphenol A). Typically, such aromatic polycarbonates are prepared by interfacial polycondensation or transesterification. The properties of the polycarbonate can be adjusted to the desired purpose through selection of the bisphenols.

Scattering Particles

In some embodiments of the present invention, the thermoplastic moulding composition may further comprise organic or inorganic scattering particles dispersed in the matrix of the thermoplastic polymer. Although the nature of the scattering particles is not particularly limited, they are typically selected in such a way that the refractive index of the scattering particles differs from that of the polymer matrix by at least 0.01. The refractive index can be measured at the Na D-line at 589 nm at 23° C. as specified in the standard ISO 489 (1999).

The scattering particles usually have a weight average particle diameter of from 0.01 μm to 100.0 μm. The weight average particle diameter—indicated as so-called volume averaged $d_{50}$-value (that is 50 percent by volume of the particles have a particle size below the specified average particle size) of the scattering particles can be measured in accordance with the standard for laser diffraction measurements ISO 13320-1 (2009). Typically, the size of the scattering particles is determined in each case in dry powder form by laser light scattering (at room temperature, 23° C.) using Beckman Coulter LS 13 320 laser diffraction particle size analyser, tornado dry powder system. The measurement is carried out as described in the manual. For computer-aided analysis model Mie is used.

Inorganic scattering particles may include traditional inorganic opacifiers, e.g. barium sulphate, calcium carbonate, titanium dioxide or zinc oxide.

Organic scattering particles are typically spherical scattering beads consisting of a cross-linked polymeric material such as poly alkyl(meth) acrylates, silicones, polystyrenes etc. For the purposes of the present invention, the term "spherical" means that the scattering beads preferably have a spherical shape, but it is clear to the person skilled in the art that, as a consequence of the methods of production, is also possible that scattering beads with some other shape may be present, or that the shape of the scattering beads may deviate from the ideal spherical shape. The term "spherical" therefore indicates that the ratio of the largest dimension of the scattering beads to the smallest dimension is not more than 4, preferably not more than 2, each of these dimensions being measured through the centre of gravity of the scattering beads. Based on the number of scattering beads, at least 70% are preferably spherical, particularly at least 90%.

Preferred scattering beads composed of crosslinked polystyrenes are commercially available from Sekisui Plastics Co., Ltd. with the trademarks Techpolymer® SBX-4, Techpolymer® SBX-6, Techpolymer® SBX-8 and Techpolymer® SBX-12.

Other particularly preferred spherical plastics particles which are used as scattering agents comprise cross-linked silicones. Silicone scattering agents particularly preferably used in the present invention are obtainable from Momentive Performance Materials Inc. as TOSPEARL® 120 and TOSPEARL® 3120.

Impact Modifiers

Mechanical properties of the thermoplastic moulding composition may be additionally adjusted to the desired purpose if it comprises an impact modifier. Impact modifiers for use in the present invention per se are well known and may have different chemical compositions and different polymer architectures. The impact modifiers may be crosslinked or thermoplastic. In addition, the impact modifiers may be in particulate form, as core-shell or as core-shell-shell particles. Typically, particulate impact modifiers have an average particle diameter between 20 nm and 500 nm, preferably between 50 nm and 450 nm, more preferably between 100 nm and 400 nm and most preferably between 150 nm and 350 nm. "Particulate impact modifiers" in this context means crosslinked impact modifiers which generally have a core, core-shell, core-shell-shell or core-shell-shell-shell structure. Average particle diameter of particulate impact modifiers can be determined by a method known to a skilled person, e.g. by photon correlation spectroscopy according to the standard DIN ISO 13321 (1996).

In the simplest case, the particulate impact modifiers are crosslinked particles obtained by means of emulsion polymerization whose average particle diameter is in the range from 10 nm to 250 nm, preferably from 20 nm to 100 nm, more preferably from 30 nm to 90 nm. These are generally composed of at least 20.0 wt.-%, preferably from 20.0 wt.-% to 99.0 wt.-%, particularly preferably in the range from 30.0 wt.-% to 98.0 wt.-% of butyl acrylate, and from 0.1 wt.-% to 2.0 wt.-%, preferably from 0.5 wt.-% to 1.0 wt.-% of a crosslinking monomer, e.g. a polyfunctional (meth)acrylate, e.g. allyl methacrylate and, if appropriate, other monomers, e.g. from 0.0 wt.-% to 10.0 wt.-%, preferably from 0.5 wt.-% to 5.0% wt.-%, of C1-C4-alkyl methacrylates, such as ethyl acrylate or butyl methacrylate, preferably methyl acrylate, or other vinylically polymerizable monomers, e.g. styrene.

Further preferred impact modifiers are polymer particles which can have core-shell or core-shell-shell structures and are obtained by emulsion polymerization (see, for example, EP-A 0 113 924, EP-A 0 522 351, EP-A 0 465 049 and EP-A 0 683 028). The present invention typically requires suitable average particle diameter of these emulsion polymers in the range from 20 nm and 500 nm, preferably between 50 nm and 450 nm, more preferably between 150 nm and 400 nm and most preferably between 200 nm and 350 nm.

A three-layer or three-phase structure with a core and two shells can have the following composition. The innermost (hard) shell can, for example, be composed of methyl methacrylate, of small proportions of comonomers, e.g. ethyl acrylate, and of a proportion of crosslinking agent, e.g. allyl methacrylate. The middle (soft) shell can, for example, be composed of a copolymer comprising butyl acrylate and, if appropriate, styrene, while the outermost (hard) shell is the same as the matrix polymer, thus bringing about compatibility and good linkage to the matrix. The proportion of polybutyl acrylate in the core or in the shell of the impact modifier of a two- or three-layer core-shell structure is decisive for the impact-modifying action and is preferably in the range from 20.0 wt.-% to 99.0 wt.-%, particularly preferably in the range from 30.0 wt.-% to 98.0 wt.-%, even more preferably in the range from 40.0 wt.-% to 97.0 wt.-%, based on the total weight of the impact modifier.

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic thermoplastic polyurethanes (TPUs) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers for use according to the present invention as impact modifiers are methacrylate-acrylate block copolymers, especially acrylic TPE, which comprises PMMA-poly-n-butyl acrylate-PMMA triblock copolymers, and which are commercially available under the Kurarity® product name by Kuraray. The poly-n-butyl acrylate blocks form nanodomains in the polymer matrix having a size between 10 nm and 20 nm.

The thermoplastic polymer for use in the present invention may comprise further conventional additives/adjuvants of any type. Among these are, inter alia antistatic agents, antioxidants, moulding-release agents, flame retardants, lubricants, flow improvers, fillers, UV absorbing agents, light stabilizers and organophosphorus compounds, such as phosphites or phosphonates, pigments, agents providing weathering resistance and plasticizers. The choice and amounts of additives can be adjusted in accordance to the intended use. Thermal stability and weathering stability of the resulting thermoplastic moulding composition should not be excessively impaired by these additives.

When the thermoplastic polymer is polyalkyl (meth) acrylate, the thermoplastic moulding composition of the present invention typically has melt flow rate MVR from 0.5 to 10.0 g/10 min, measured at 230° C. with a load of 3.8 kg according to ISO 1133 (2011). Hence, the thermoplastic moulding composition can be advantageously used for injection moulding as well as for extrusion.

Jet-black coloured thermoplastic moulding compositions of the present invention typically have an L*-value of from 0.4 to 2 in accordance with DIN 5033. If desired, the compositions can often have an L*-value as low as from 0.4 to 1, in particular from 0.4 to 0.9. Gloss (R 60°; measured according to DIN 67530 (1982)) of such moulding compositions is typically at least 60, more preferably at least 70, even more preferably at least 80, particularly preferably at least 90.

Insufficient weathering stability of a thermoplastic moulding composition often leads to undesired colour changes upon exposure to increased temperatures. Therefore, weathering stability of a given moulding composition can often be estimated by measuring the colours in the CIELAB colour space of a sample of such moulding composition before and after exposing it to a weathering test. The colour difference, i.e. the difference between these two colours can serve as an indicator for the weathering stability.

In a preferred embodiment, the colour difference ΔE (CIELAB 1976 ($D_{65}$, 10°) determined according to the standard DIN 6174) of the moulding composition after 3000 hours of artificial weathering is less than 3.0, preferably less than 2.5, particularly preferably less than 2.0. The corresponding test is carried out under the following conditions:

Instrument: Xenotest Beta LM/1
Filter: Xenochrome 300 filter system, daylight (ISO 4892-2)
Irradiance: 60 W/m² (300-400 nm)
Temperatures: chamber 38±3° C., black standard 65±3° C.
Humidity: 65±10% RH
102 min dry, 18 min water spray Process for the Manufacturing of Thermoplastic Moulding Composition A further embodiment of the present invention is related to a process for the manufacturing of a thermoplastic moulding composition as defined above, wherein the process comprises the following steps:
a) providing a thermoplastic polymer; and
b) adding to the thermoplastic polymer from step a) at least one colouring composition, comprising carbon black and a monoazo dye comprising at least one heteroaromatic moiety, wherein said colouring composition is preferably a liquid composition or a masterbatch.

In one embodiment, in the step b) a single colouring composition is added to the thermoplastic polymer from step a), wherein said preparation comprises the monoazo dye in combination with carbon black. In yet a further embodiment, in the step b) two or more colouring compositions can be added, wherein one preparation may comprise the monoazo dye and the other preparation may comprise carbon black. If two or more colouring compositions are added in the step b), they can be added in any order or simultaneously.

Colouring compositions may be, for instance, liquid compositions or masterbatches. If the colouring composition is added to the thermoplastic polymer in form of a liquid composition, the liquid composition typically comprises from 1.0 to 30.0 wt.-%, preferably from 5.0 to 25.0 wt.-%, more preferably from 1.0 to 20.0 wt.-% of a dispersing additive
from 0.05 to 10.0 wt.-%, preferably from 0.1 to 5.0 wt.-% of carbon black
from 0.5 to 50.0 wt.-%, preferably from 5.0 to 40.0 wt.-% of the monoazo dye and
from 0.0 to 50.0 wt.-%, preferably from 0.0 to 10.0 wt.-%, more preferably from 0.0 to 5.0 wt.-% of auxiliary additives and a liquid such as e.g. demineralized water or an organic solvent, where the portions by weight of the components of the liquid composition add up to 100 wt.-%. Examples of an organic solvent include but are not limited to publicly known organic solvents such as acetone, methyl ethyl ketone, methyl-n-butyl ketone, methyl isobutyl ketone, ethyl isobutyl ketone, tetrahydrofuran, dioxane, dimethylformamide, diethylformamide, dimethylacetamide, diethylacetamide, N-methyl pyrrolidone, methanol, ethanol, isopropanol, ethylene glycol, propylene glycol, 2-methoxy-2-propanol and tetraglyme or mixtures thereof.

The choice of the dispersing additive is not particularly limited as long as the additive does not adversely affect properties of the resulting thermoplastic moulding composition. Use of pH-independent dispersing additives showed to be particularly advantageous in terms of thermal stability of the resulting thermoplastic moulding composition and colour uniformity.

For instance, the dispersing additive may be a high molecular weight copolymer comprising at least maleic anhydride, styrene and an amino polyether as monomer units. Alternatively, the dispersing additive may also be a copolymer of methacrylic acid with hydrophobic methacrylates. The term "hydrophobic methacrylates" as used herein preferably refers to esters of methacrylic acid with alcohols having at least 3 and not more than 24 carbon atoms. Still, the dispersing additive can be a copolymer of polyethers, preferably ethylene oxide, propylene oxide and/or butylene oxide, and styrene oxide.

Suitable dispersing additives include, for example, a polyacrylate Dispex® Ultra 4550 (former EFKA® 4550) which is commercially available from BASF SE. This polymer consists essentially of the monomers α-methylstyrene, 2-ethylhexyl acrylate and poly(ethylene glycol) methyl ether (MPEG) methacrylate. Further examples of suitable dispersing additives are TEGO® Dispers 750W and 755W, available from Evonik Industries AG and Disperbyk® 190 from BYK-Chemie GmbH.

Optionally, in order to minimize undesired discoloration of the moulding composition at increased temperatures, the dispersing additives may be selected in such a way that a mass loss of the dispersing additive in dried form is not more than 15.0 wt.-%, preferably from 0.0 to 10.0 wt.-%, more preferably from 0.0 to 7.0 wt.-%, even more preferably from 0.0 to 5.0 wt.-% and especially preferably from 0.0 to 4.0 wt.-% in isothermal thermogravimetric analysis (TGA) at 260° C. for 15 min. The isothermal thermogravimetric analysis is performed by means of an automatic thermal balance such as e.g. Q5000 IR from TA Instruments with a heating rate of 5 K/min up to 260° C. and subsequent isothermal analysis at 260° C. for 15 min. The samples are dried to constant mass in a drying oven before the analysis by TGA. In the case of bead polymers as dispersing aids, the TGA is carried out on the solid bead polymer. In other words, in the case of an aqueous alkaline solution of the bead polymer, the solid bead polymer used to prepare this solution is analysed.

In addition to dispersing additives, the liquid preparation may comprise auxiliary additives, for example agents to prevent decay or bacterial decomposition, fungicides, levelling agents, thickeners and defoamers.

In some embodiments, for instance if the liquid preparation contains pigments or pigment mixtures, especially if their concentrations is less than 10.0 wt.-%, a viscosity adjustment may be advantageous to prevent sedimentation of pigments or pigment mixtures. This is preferably done by adding one or more thickeners. Preferred thickeners include inter alia celluloses, especially ethylcellulose. As a further possibility, carboxylate-containing polymers, which are available as water- or alkali-soluble solid products, as colloidal solutions or as aqueous dispersions, for example homo- and copolymers based on vinyl acetate and crotonic acid or partly hydrolysed poly(meth)acrylates may be used as thickeners. Particular preference is given to homo- and copolymers of acrylic acid and/or methacrylic acid in the form of the sodium salts thereof.

The proportion of the ethylenically unsaturated, free-radically polymerizable carboxylic acid is preferably not less than 6.0 and not more 80.0 wt.-%, preferably from 10.0 to 80.0 wt.-%, especially from 20.0 to 80.0 wt.-%, based on the total weight of the monomers used to prepare the thickeners. Acrylic acid and/or methacrylic acid and maleic acid are preferred, whereby fumaric acid, itaconic acid or crotonic acid are also suitable.

The comonomers involved in the formation of the thickeners may be ethylenically unsaturated, free-radically polymerizable monomers of high or low water solubility. An advantageous effect is possessed by ethylene and alkyl esters of acrylic acid and/or methacrylic acid, especially having 1 to 4 carbon atoms in the alkyl radical. The proportion thereof is preferably from 20.0 to 90.0 wt.-%, more preferably from 20.0 to 80.0 wt.-%, based on the total weight of the monomers used for preparation of the thickeners. Other useable comonomers are, for example, styrene, acrylonitrile or vinyl acetate. Comonomers which have higher hydrophilicity or are water-soluble, such as acrylamide and/or methacrylamide or hydroxyalkyl esters of acrylic acid and/or methacrylic acid, may also be used, for example, in proportions totaling about 30.0 wt.-%, preferably up to 10.0 wt.-%, based on the total weight of the monomers used to prepare the thickeners.

The thermoplastic polymer can also be coloured by adding to the thermoplastic polymer from step a) a colouring composition in form of a masterbatch. A masterbatch is understood to mean a formulation comprising a polymer moulding material, the monoazo dye and/or carbon black. The concentration of the colouring preparation in the masterbatch is adjusted such that the desired colour impression arises when the masterbatch is used to colour uncoloured thermoplastic polymer from the step a).

The masterbatch added in the step b) typically comprises:
from 0.01 to 40.0 wt.-% of the monoazo dye
from 0.01 to 10.0 wt.-% of carbon black
from 50.0 to 99.99 wt.-% of the thermoplastic polymer
from 0.0 to 10.0 wt.-% of at least one auxiliary additive.

The thermoplastic polymer in the masterbatch may be substantially the same as described above. The choice of the thermoplastic polymer in the masterbatch is not particularly limited, as long as the thermoplastic polymer is suitable for colouring and thermoplastic processing, in particular for injection moulding and extrusion. For instance, thermoplastic polymer may be advantageously selected from the group consisting of polyalkyl (meth)acrylate, polymethylmethacrylimide, polyalkyl (meth)acrylate copolymers, polystyrene, polystyrene copolymer, acrylonitrile copolymers, polycarbonates, polyester, preferably polyethylene terephthalate, polyamides, polyvinylidene fluoride or a mixture thereof.

The thermoplastic polymer can also be coloured by adding to the thermoplastic polymer from the step a) neat colouring preparation and carbon black as obtained from the manufacturer.

The inventors further found that the colouring preparation used in the step b), should advantageously comprise less than 100 ppm of aluminium compounds and less than 300 ppm of silicon compounds. This effectively prevents formation of undesired dark particles in the moulding compositions. Without wishing to be bound by theory, the inventors found that compounds of aluminium and silicon, even if present in amounts as low as a few hundred ppm, appear to form chelate-type chemical complexes with monoazo dyes comprising at least one heteroaromatic moiety. In contrast to free monoazo dyes, such chemical complexes are substantially insoluble in the thermoplastic polymer matrix and lead to undesired formation of dark particles in the resulting moulded parts. In particular, if parts having a complex geometrical shape are manufactured by means of injection moulding, use of increased temperatures is often necessary to ensure a sufficiently low viscosity of the polymer melt. Increased temperatures in combination with high shearing forces during the injection moulding process appear to facilitate formation of such undesired dark particles in presence of aluminium or silicone.

The inventors further found that optical properties and thermal stability of the thermoplastic moulding composition can be even further improved if the colouring preparation has a mass loss in dried form of not more than 15.0 wt.-%, preferably from 0.0 to 10.0 wt.-%, more preferably from 0.0 to 7.0 wt.-%, even more preferably from 0.0 to 5.0 wt.-% and especially preferably from 0.0 to 4.0 wt.-% in isothermal thermogravimetric analysis (TGA) at 260° C. for 15 min. Without wishing to be bound by a theory it appears that colouring preparations having a particularly low mass loss in dried form normally generate particularly low amounts of by-products which have a low solubility in the thermoplastic polymer and are responsible for formation of various optical defects in the final thermoplastic moulding composition.

Process for production of a thermoplastic moulding composition according to the invention can be carried out by conventional incorporation processes by combining, mixing and homogenizing the thermoplastic polymer and the liquid composition or a masterbatch. This can be performed in the melt under the action of shear forces. Combining and mixing prior to melt homogenisation are optionally carried out using powder premixtures, in particular, if a masterbatch comprising the monoazo dye and/or carbon black is introduced.

The thermoplastic polymer and the masterbatch, the liquid composition or neat colouring preparation as obtained from the manufacturer can be combined, mixed, homogenized and then extruded in conventional devices such as screw-type extruders (for example twin-screw extruder, ZSK), kneaders, Brabender or Banbury mills. After the extrusion, the extrudate can be cooled and pelletized. It is also possible for individual components to be premixed and the remaining starting materials subsequently to be added separately and/or likewise as a mixture. The term "colouring preparation" as used in the present application refers to a material commercially available from manufacturers as a "dye". A colouring preparation substantially consists of the corresponding monoazo dye having a varying chemical purity.

In yet a further embodiment the thermoplastic polymer can be provided in form of a hot melt and the liquid composition or the masterbatch is added thereto. This method is particularly advantageous for colouring of thermoplastic polymers directly after their production.

Typically, if the thermoplastic polymer is polyalkyl (meth)acrylate, the step b) is carried out in an extruder, preferably at a temperature ranging from 200° C. to 320° C., more preferably from 230° C. to 300° C., since the moulding composition has an excellent thermal stability and no undesired formation of dark particles takes place at this stage.

Use of the Thermoplastic Moulding Composition

In its further aspect, the present invention relates to a process for the manufacturing of a moulded part, wherein the process comprises a step of injection moulding of the thermoplastic moulding composition at a temperature ranging from 200° C. to 320° C., preferably from 230° C. to 300° C., wherein the thermoplastic moulding composition is injected into a mould which can produce the moulded part, wherein the thermoplastic moulding composition comprises a monoazo dye comprising at least one heteroaromatic moiety and the thermoplastic moulding composition comprises
less than 100 ppm, preferably less than 50 ppm of aluminium or a compound thereof and
less than 300 ppm, preferably less than 200 ppm of silicon or a compound thereof.

When the thermoplastic polymer is polyalkyl (meth) acrylate, the temperature of the molten moulding composition during the inventive injection-moulding process is preferably from 210 to 320° C., and still more preferably from 240 to 270° C., with no intended resultant restriction. Temperature of the injection-moulding nozzle is moreover preferably from 230 to 270° C., still more preferably from 240 to 250° C., and the temperature of the injection mould is preferably from 40 to 80° C. and still more preferably from 50 to 60° C. The temperature of the injection-moulding cylinder is preferably from 220 to 260° C. and still more preferably from 230 to 250° C. In the inventive process, the moulding composition is injected with a pressure in the range from 50 to 1000 bar into the mould. One particular embodiment here applies the pressure in stages, the pressure being 50 bar in the first stage and 400 bar in the second stage.

The injection rate may also be staged, being in the range from 0.01 m/s to 0.1 m/s in the first stage and from 0.1 m/s to 1 m/s in the second stage, and in the range from 0.05 m/s to 0.5 m/s in a possible third stage. The metering stroke here is preferably from 1 to 4 times the screw diameter.

Importantly, the process of the present invention is highly suitable for the manufacturing of complex moulded parts, such as those with variable thickness and/or with perforations. Thickness differences in the corresponding injection mould, and in particular perforations, i.e. regions around which the melt is injected within the mould, have a marked effect on the rheology of the material as it fills the mould cavity or cavities. For the purposes of the present invention, a complex moulded part is a moulding which has one or more of the features described below.

In one embodiment of the inventive process, a complex moulded part has differing wall thicknesses. The complex moulded part obtained is preferably one whose wall thickness is in the range from 1 to 30 mm and may vary within the complex moulded part. By way of example, the variation in the wall thickness may be stated via the difference between minimum and maximum wall thickness of the complex moulded part, this difference being more than 1 mm, preferably more than 5 mm and particularly preferably more than 10 mm. The maximum-to-minimum wall thickness ratio is preferably in the range >1:20 and more preferably in the range >1:10, and is particularly preferably >1:4, and most preferably >1:2.

In another embodiment of the inventive process, a complex moulded part has at least one perforation. The wall thickness of the complex moulded part is zero at the site of a perforation. The moulding composition surrounding a perforation may develop a uniform or varying wall thickness in the surrounding region, the wall thickness preferably being within the range stated above.

Another embodiment of the process described above produces a complex moulded part which has at least one non-planar surface. This surface is preferably of convex or concave design.

A further aspect of the present invention relates to process for the manufacturing of an extruded part, wherein the process comprises an extrusion process of a thermoplastic moulding composition at a temperature ranging from 200° C. to 320° C., preferably from 230° C. to 300° C., wherein the thermoplastic moulding composition is melted and diecasted to the final part, wherein the thermoplastic moulding composition comprises a monoazo dye comprising at least one heteroaromatic moiety and the thermoplastic moulding composition comprises less than 100 ppm, preferably less than 50 ppm of aluminium or a compound thereof and less than 300 ppm, preferably less than 200 ppm of silicon or a compound thereof.

The contents of aluminium and silicon in the colouring preparation can be readily determined by a method such as atom emission spectrometry. For instance, the samples can be digestion mineralized using a microwave pressure digestion system MARS 5 PLUS/MARS 6 and then analysed using an atomic emission spectrometer iCAP™ 7400 ICP-OES Analyzer, available from ThermoFischer Scientific.

Extrusion of thermoplastic polymers is widely known and is described for example in Kunststoffextrusionstechnik II [Plastics extrusion technology II], Hanser Verlag, 1986, p. 125 ff). In the method according to the invention, a hot melt is extruded from the nozzle of the extruder onto a gap between two calendar rolls. The optimum temperature of the melt depends for example on the composition of the mixture and can therefore vary in wide ranges. Preferred temperatures of the polyalkyl (meth)acrylate moulding compound as far as the nozzle entry lie in the range of from 150 to 300° C., particularly preferably in the range of from 180 to 270° C. and more particularly preferably in the range of from 200 to 220° C. The temperature of the calendar rolls is preferably less than or equal to 150° C., preferably between 60° C. and 140° C.

Thermoplastic moulding compositions of the present invention can be advantageously used for production of mouldings with greyish or jet-black appearance and high gloss for the use in motor vehicles, household appliances, electrical equipment, decorative strips, and outdoor cladding, external region of motor vehicles, e.g. A-, B-, C-, or D-pillar cladding, spoilers, window frames, cover strips, hood, and panels, or as part of the radiator grille, of the antenna cladding, of the side mirror, or of the front or rear lamps.

EXAMPLES

Test Methods

The colour measurement was carried out using a spectral photometer Color Eye 7000 A, obtainable from X-Rite Inc, Grand Rapids United States. Subsequently, the colour coordinates (L*, a* and b*) of the specimen were measured using a spectral photometer according to the standard DIN 5033 (2017), Parts 1-4 and the colour difference ΔE CIELAB 1976 ($D_{65}$, 10°) of each sample was determined according to the norm DIN 6174.

For transparent colours (Y D65/10°>1, measured in transmittance according) ΔE is determined via transmittance measurement. For opaque colours (Y D65/10°≤1, measured in transmittance according to EN ISO 13488-2) ΔE is determined via reflectance measurement.

The weathering tests were carried out with the following parameters:

Xenotest
  Device: Xenotest Beta LM/1
  Filter: Xenochrome 300 filter system, daylight (ISO 4892-2)
  Irradiance: 60 W/m² (300-400 nm)

Temperatures: chamber 38±3° C., black standard 65±3° C.

Humidity: 65±10% RH 102 min dry, 18 min water spray

Suntest
  Device: Xenotest Beta LM/1
  Filter: Xenochrome 300 filter system, daylight (ISO 4892-2)
  Irradiance: 60 W/m² (300-400 nm)
  Temperatures: chamber 38±3° C., black standard 65±3° C.
  Humidity: 65±10% RH
  No drizzle cycle In a 750 h Suntest specimens having ΔE above 0.4 were evaluated as those having a low weathering stability, specimens having ΔE between 0.1 and 0.4 were evaluated as those with a moderate weathering stability and specimens having ΔE lower than 0.1 were evaluated as those with an excellent weathering stability.

In a 3000 h Xenotest specimens having ΔE above 3 were evaluated as those having a low weathering stability, specimens having ΔE between 2 and 3 were evaluated as those with a moderate weathering stability and specimens having ΔE lower than 2 were evaluated as those with an excellent weathering stability.

Thermoplastic moulding compositions of Examples 1 to 5 were produced in the following manner:

Polymer granules and colouring preparations or masterbatches as received from the manufacturers were used in a tumbling mixer to produce a mixture which was metered by means of a funnel into the feed zone of a single-screw extruder 30 ESE from Herbert Stork Maschinenbau GmbH, Mörfelden. Extrusion took place at 250° C. The venting zones were attached to a vacuum pump. A granulator was connected downstream of the extruder.

In a second processing step, specimens were injection-moulded from the granules thus obtained. In each example, separate specimens having a thickness of 3.0 mm were injection moulded at 260° C. on Arburg Allrounder 320 C, available from ARBURG GmbH & Co KG, Lossburg, under the following conditions:
  Injection time: 0.92 sec
  Material temp.: 250° C.
  Cylinder temp.: 250 to 220° C.
  Mould temp.: 70° C.
  Switch from injection to hold pressure at internal mould pressure 600 bar
  Total cycle time: 40 sec
  Injection moulding with closed venting cylinder.

Example 1 (Comparative)

Perinone-type solvent dye MACROLEX® Red E2G (Solvent Red 179) was purchased from Lanxess Deutschland GmbH, Cologne.

Polymethyl methacrylate PLEXIGLAS® 7H, commercially available from Röhm GmbH, was used as a thermoplastic material. The obtained thermoplastic moulding composition contained 0.1 wt.-% Solvent Red 179 and 0.0001 wt.-% of colour black FW1 (Pigment Black 7).

The injection moulded specimen was subjected to a 750 h Suntest as described above. ΔE (transmittance) of the specimen after the Suntest was 0.81 which indicates a low weathering stability.

Example 2 (Comparative)

Perinone-type solvent dye MACROLEX® Red EG (Solvent Red 135) was purchased from Lanxess Deutschland GmbH, Cologne.

Polymethyl methacrylate PLEXIGLAS® 7H, commercially available from Röhm GmbH, was used as a thermoplastic material. The obtained thermoplastic moulding composition contained 0.1 wt.-% Solvent Red 135 and 0.0001 wt.-% of colour black FW1 (Pigment Black 7).

The injection moulded specimen was subjected to a 750 h Suntest as described above. ΔE (transmittance) of the specimen after the Suntest was 0.18 which indicates a moderate weathering stability.

Example 3 (Inventive)

Monoazo dye Oracet® Red 454 (Solvent Red 195) was purchased from BASF SE, Ludwigshafen.

Polymethyl methacrylate PLEXIGLAS® 7H, commercially available from Röhm GmbH, was used as a thermoplastic material. The obtained thermoplastic moulding composition contained 0.1 wt.-% Solvent Red 195 and 0.0001 wt.-% of colour black FW1 (Pigment Black 7).

The injection moulded specimen was subjected to a 750 h Suntest as described above. ΔE (transmittance) of the specimen after the Suntest was 0.09 which indicates an excellent weathering stability.

Example 4 (Inventive)

Polymethyl methacrylate PLEXIGLAS® 8N, commercially available from Röhm GmbH, was used as a thermoplastic material. The thermoplastic moulding composition was prepared from a mixture having the following composition:
  98.63 wt.-% PLEXIGLAS® 8N
  0.67 wt.-% masterbatch comprising 0.1 wt.-% Oracet® Red 454 (Solvent Red 195) from BASF SE, Ludwigshafen
  0.37 wt.-% masterbatch comprising 1.0 wt.-% colour black FW1 (Pigment Black 7) from The Cary Company, Addison, USA
  0.33 wt.-% masterbatch comprising 1.0 wt.-% Microlith® Blue 7080W (Pigment Blue 15:3) from BASF SE, Ludwigshafen The injection moulded specimen had an aesthetically pleasing appearance.

The specimen was subjected to a 3000 h Xenotest as described above. ΔE (transmittance) of the specimen after the Xenotest was 1.9 which indicates an excellent weathering stability.

Example 4A (Comparative without Carbon Black)

Polymethyl methacrylate PLEXIGLAS® 8N, commercially available from Röhm GmbH, was used as a thermoplastic material. The thermoplastic moulding composition was prepared from a mixture having the following composition:
  99 wt.-% PLEXIGLAS® 8N
  0.67 wt.-% masterbatch comprising 0.1 wt.-% Oracet® Red 454 (Solvent Red 195) from BASF SE, Ludwigshafen
  0.33 wt.-% masterbatch comprising 1.0 wt.-% Microlith® Blue7080W (Pigment Blue 15:3) from BASF SE, Ludwigshafen The specimen was subjected to a 3000 h Xenotest as described above. ΔE (transmittance) of the specimen after the Xenotest was 4.0 which indicates an insufficient weathering stability.

Example 5 (Inventive)

Polymethyl methacrylate PLEXIGLAS® 8N, commercially available from Röhm GmbH, was used as a thermoplastic material. The thermoplastic moulding composition was prepared from a mixture having the following composition:
95.9 wt.-% PLEXIGLAS® 8N
0.2 wt.-% masterbatch comprising 10.0 wt.-% Oracet® Red 454 (Solvent Red 195) from BASF SE, Ludwigshafen
0.2 wt.-% masterbatch comprising 10.0 wt.-% Printex® 140 (Pigment Black 7) from The Cary Company, Addison, USA
2.6 wt.-% masterbatch comprising 10.0 wt.-% Oracet® Blue 690 (Solvent Blue 104) from BASF SE, Ludwigshafen
0.5 wt.-% masterbatch comprising 10.0 wt.-% Macrolex® Yellow G (Solvent Yellow 114) from Lanxess Deutschland GmbH, Cologne
0.6 wt.-% masterbatch comprising 1.0 wt.-% Macrolex® Green G (Solvent Green 28) from Lanxess Deutschland GmbH, Cologne The injection moulded specimen had an aesthetically pleasing appearance.

The specimen was subjected to a 3000 h Xenotest as described above. ΔE (reflectance) of the specimen after the Xenotest was 0.4 which indicates an excellent weathering stability.

Example 6 (Inventive)

Polymethyl methacrylate PLEXIGLAS® 8N, commercially available from Röhm GmbH, was used as a thermoplastic material. The thermoplastic moulding composition was prepared from a mixture having the following composition:
99.344 wt.-% PLEXIGLAS® 8N
0.32 wt.-% masterbatch comprising 0.01 wt.-% Oracet® Red 454 (Solvent Red 195) from BASF SE, Ludwigshafen
0.176 wt.-% masterbatch comprising 0.1 wt.-% colour black FW1 (Pigment Black 7) from The Cary Company, Addison, USA
0.16 wt.-% masterbatch comprising 0.1 wt.-% Microlith® Blue 7080W (Pigment Blue 15:3) from BASF SE, Ludwigshafen The injection moulded specimen had an aesthetically pleasing appearance.

The specimen was subjected to a 3000 h Xenotest as described above. ΔE (transmittance) of the specimen after the Xenotest was 0.4 which indicates an excellent weathering stability.

Example 7 (Inventive)

Polymethyl methacrylate PLEXIGLAS® 8N, commercially available from Röhm GmbH, was used as a thermoplastic material. The thermoplastic moulding composition was prepared from a mixture having the following composition:
98.864 wt.-% PLEXIGLAS® 8N
0.145 wt.-% masterbatch comprising 10 wt.-% Oracet® Red 454 (Solvent Red 195) from BASF SE, Ludwigshafen
0.377 wt.-% masterbatch comprising 1 wt.-% Macrolex® Yellow G (Solvent Yellow 114) from Lanxess AG, Leverkusen,
0.322 wt.-% masterbatch comprising 0.1 wt.-% colour black FW1 (Pigment Black 7) from The Cary Company, Addison, USA
0.292 wt.-% masterbatch comprising 0.1 wt.-% Microlith® Blue 7080W (Pigment Blue 15:3) from BASF SE, Ludwigshafen The injection moulded specimen had an aesthetically pleasing appearance.

The specimen was subjected to a 3000 h Xenotest as described above. ΔE (transmittance) of the specimen after the Xenotest was 1.1 which indicates an excellent weathering stability.

Example 7A (Comparative without Monoazo Dye)

Solvent Red 179 is used instead of Solvent Red 195 (monoazo dye used in inventive example 7).

Polymethyl methacrylate PLEXIGLAS® 8N, commercially available from Röhm GmbH, was used as a thermoplastic material. The thermoplastic moulding composition was prepared from a mixture having the following composition:
98.9945 wt.-% PLEXIGLAS® 8N
0.0145 wt.-% Macrolexred E2G as pure colorant (Solvent Red 179) from Lanxess AG, Leverkusen
0.377 wt.-% masterbatch comprising 1 wt.-% Macrolex® Yellow G (Solvent Yellow 114) from Lanxess AG, Leverkusen,
0.322 wt.-% masterbatch comprising 0.1 wt.-% colour black FW1 (Pigment Black 7) from The Cary Company, Addison, USA
0.292 wt.-% masterbatch comprising 0.1 wt.-% Microlith® Blue 7080W (Pigment Blue 15:3) from BASF SE, Ludwigshafen The specimen was subjected to a 3000 h Xenotest as described above. ΔE (transmittance) of the specimen after the Xenotest was 5.4 which indicates an insufficient weathering stability.

Example 7B (Comparative without Carbon Black)

Polymethyl methacrylate PLEXIGLAS® 8N, commercially available from Röhm GmbH, was used as a thermoplastic material. The thermoplastic moulding composition was prepared from a mixture having the following composition:
99.186 wt.-% PLEXIGLAS® 8N
0.145 wt.-% masterbatch comprising 10 wt.-% Oracet® Red 454 (Solvent Red 195) from BASF SE, Ludwigshafen
0.377 wt.-% masterbatch comprising 1 wt.-% Macrolex® Yellow G (Solvent Yellow 114) from Lanxess AG, Leverkusen,
0.292 wt.-% masterbatch comprising 0.1 wt.-% Microlith® Blue 7080W (Pigment Blue 15:3) from BASF SE, Ludwigshafen The specimen was subjected to a 3000 h Xenotest as described above. ΔE (transmittance) of the specimen after the Xenotest was 3.8 which indicates an insufficient weathering stability.

Example 8 (Inventive)

Polymethyl methacrylate PLEXIGLAS® 7N, commercially available from Röhm GmbH, was used as a thermoplastic material. The thermoplastic moulding composition was prepared from a mixture having the following composition:

97.99 wt.-% PLEXIGLAS® 7N 0.38 wt.-% masterbatch comprising 10 wt.-% Oracet® Red 454 (Solvent Red 195) from BASF SE, Ludwigshafen 0.45 wt.-% masterbatch comprising 10 wt.-% Macrolex® Yellow G (Solvent Yellow 114) from Lanxess AG, Leverkusen 0.38 wt.-% masterbatch comprising 10 wt.-% colour black FW1 (Pigment Black 7) from The Cary Company, Addison, USA 0.3 wt.-% masterbatch comprising 10 wt.-% Oracet® Blue 640 (Solvent Blue 104) from BASF SE, Ludwigshafen 0.5 wt.-% masterbatch comprising 10 wt.-% Bayferrox® 645T (Pigment Brown 43) from Lanxess AG, Leverkusen The injection moulded specimen had an aesthetically pleasing appearance.

The specimen was subjected to a 3000 h Xenotest as described above. ΔE (reflectance) of the specimen after the Xenotest was 0.51 which indicates an excellent weathering stability.

Example 8A (Comparative without Monoazo Dye)

Solvent Red 179 is used instead of Solvent Red 195 (monoazo dye used in inventive example 8).

Polymethyl methacrylate PLEXIGLAS® 7N, commercially available from Röhm GmbH, was used as a thermoplastic material. The thermoplastic moulding composition was prepared from a mixture having the following composition:

98.332 wt.-% PLEXIGLAS® 7N 0.038 wt.-% Macrolexred E2G as pure colorant (Solvent Red 179) from Lanxess AG, Leverkusen 0.45 wt.-% masterbatch comprising 10 wt.-% Macrolex® Yellow G (Solvent Yellow 114) from Lanxess AG, Leverkusen 0.38 wt.-% masterbatch comprising 10 wt.-% colour black FW1 (Pigment Black 7) from The Cary Company, Addison, USA 0.3 wt.-% masterbatch comprising 10 wt.-% Oracet® Blue 640 (Solvent Blue 104) from BASF SE, Ludwigshafen 0.5 wt.-% masterbatch comprising 10 wt.-% Bayferrox® 645T (Pigment Brown 43) from Lanxess AG, Leverkusen The specimen was subjected to a 3000 h Xenotest as described above. ΔE (reflectance) of the specimen after the Xenotest was 0.9 which indicates a worse weathering stability in comparison to example 8.

Example 8B (Comparative without Carbon Black)

Polymethyl methacrylate PLEXIGLAS® 7N, commercially available from Röhm GmbH, was used as a thermoplastic material. The thermoplastic moulding composition was prepared from a mixture having the following composition:

98.37 wt.-% PLEXIGLAS® 7N 0.38 wt.-% masterbatch comprising 10 wt.-% Oracet® Red 454 (Solvent Red 195) from BASF SE, Ludwigshafen 0.45 wt.-% masterbatch comprising 10 wt.-% Macrolex® Yellow G (Solvent Yellow 114) from Lanxess AG, Leverkusen 0.3 wt.-% masterbatch comprising 10 wt.-% Oracet® Blue 640 (Solvent Blue 104) from BASF SE, Ludwigshafen 0.5 wt.-% masterbatch comprising 10 wt.-% Bayferrox® 645T (Pigment Brown 43) from Lanxess AG, Leverkusen The specimen was subjected to a 3000 h Xenotest as described above. ΔE (reflectance) of the specimen after the Xenotest was 1.0, which indicates a worse weathering stability in comparison to example 8.

Example 9 (Inventive)

Polymethyl methacrylate PLEXIGLAS® 7N, commercially available from Röhm GmbH, was used as a thermoplastic material. The thermoplastic moulding composition was prepared from a mixture having the following composition:

98.52 wt.-% PLEXIGLAS® 7N 0.25 wt.-% masterbatch comprising 10 wt.-% Oracet® Red 454 (Solvent Red 195) from BASF SE, Ludwigshafen 0.3 wt.-% masterbatch comprising 10 wt.-% Macrolex® Yellow G (Solvent Yellow 114) from Lanxess AG, Leverkusen 0.5 wt.-% masterbatch comprising 10 wt.-% colour black FW1 (Pigment Black 7) from The Cary Company, Addison, USA 0.43 wt.-% masterbatch comprising 10 wt.-% Sicotan® Yellow K2111 FG (Pigment Brown 24) from BASF SE, Ludwigshafen The injection moulded specimen had an aesthetically pleasing appearance.

The specimen was subjected to a 3000 h Xenotest as described above. ΔE (reflectance) of the specimen after the Xenotest was 0.70 which indicates an excellent weathering stability.

Example 9A (Comparative without Carbon Black)

Polymethyl methacrylate PLEXIGLAS® 7N, commercially available from Röhm GmbH, was used as a thermoplastic material. The thermoplastic moulding composition was prepared from a mixture having the following composition:

99.02 wt.-% PLEXIGLAS® 7N 0.25 wt.-% masterbatch comprising 10 wt.-% Oracet® Red 454 (Solvent Red 195) from BASF SE, Ludwigshafen 0.3 wt.-% masterbatch comprising 10 wt.-% Macrolex® Yellow G (Solvent Yellow 114) from Lanxess AG, Leverkusen 0.43 wt.-% masterbatch comprising 10 wt.-% Sicotan® Yellow K2111 FG (Pigment Brown 24) from BASF SE, Ludwigshafen The specimen was subjected to a 3000 h Xenotest as described above. ΔE (reflectance) of the specimen after the Xenotest was 1.2 which indicates a worse weathering stability in comparison to example 9.

Example 10 (Inventive)

Polymethyl methacrylate PLEXIGLAS® 7H, commercially available from Röhm GmbH, was used as a thermoplastic material. The thermoplastic moulding composition was prepared from a mixture having the following composition:
- 98.1 wt.-% PLEXIGLAS® 7H
- 0.2 wt.-% masterbatch comprising 10 wt.-% Oracet® Red 454 (Solvent Red 195) from BASF SE, Ludwigshafen
- 0.67 wt.-% masterbatch comprising 10 wt.-% Macrolex® Yellow G (Solvent Yellow 114) from Lanxess AG, Leverkusen
- 0.7 wt.-% masterbatch comprising 10 wt.-% Printex® 140 V (Pigment Black 7) from The Cary Company, Addison, USA
- 0.33 wt.-% masterbatch comprising 10 wt.-% Macrolex® Green G (Solvent Green 28) from Lanxess AG, Leverkusen The injection moulded specimen had an aesthetically pleasing appearance.

The specimen was subjected to a 3000 h Xenotest as described above. ΔE (reflectance) of the specimen after the Xenotest was 0.61 which indicates an excellent weathering stability.

The invention claimed is:

1. A thermoplastic moulding composition, comprising:
   from 90.0 to 99.99989 wt.-% of a thermoplastic polymer;
   from 0.0001 to 5.0 wt.-% of carbon black; and
   from 0.00001 to 5.0 wt.-% of a monoazo dye,
   wherein the thermoplastic polymer is polymethyl methacrylate having a weight average molecular weight Mw of from 80,000 g/mol to 180,000 g/mol and is obtained by polymerization of a polymerizable composition whose polymerizable constituents comprise, based on a weight of the polymerizable composition:
   (i) from 50.0 to 99.9 wt.-% of methyl methacrylate,
   (ii) from 0.1 to 50.0 wt.-% of an acrylic acid ester of a $C_1$-$C_4$ alcohol, and
   (iii) from 0.0 to 35.0 wt.-% of at least one further monomer copolymerizable with monomers (i) and (ii); and
   wherein the monoazo dye is at least one selected from the group consisting of 5-[(3,4-dichlorophenyl)azo]-1,2-dihydro-6-hydroxy-1,4-dimethyl-2-oxonicotinonitrile, 2,3-dihydro-2,2-dimethyl-6-((4-(phenylazo)-1-naphthyl)azo)-1H-perimidin, cyano-5-[[5-cyano-2,6-bis[(3-methoxypropyl)amino]-4-methylpyridin-3-yl]azo]-3-methyl-2-thiophenecarboxylic acid methyl ester, 5-methyl-2-phenyl-4-phenylazo-4H-pyrazol-3-one, 4-[(2,4-dimethylphenyl)azo]-2,4-dihydro-5-methyl-2-phenyl-3H-pyrazol-3-one, 3-[(1-oxonaphthalen-2-ylidene)methylhydrazinylidene]-1-prop-2-enylindol-2-one, 4-((o-methoxyphenyl)azo)-3-methyl-1-phenyl-2-pyrazolin-5-one, and 5-methyl-2-phenyl-4-phenylazo-4H-pyrazol-3-one.

2. The thermoplastic moulding composition according to claim 1, wherein the carbon black has a weight average particle size of from 5.0 to 100.0 nm, and a specific surface area, determined by BET method, of from 50 to 500 m²/g.

3. The thermoplastic moulding composition according to claim 1, further comprising:
   at least one further dye selected from perinone dye, quinophthalone dye, and anthraquinone dye;
   at least one phthalocyanine pigment; or
   any mixture of the above.

4. The thermoplastic moulding composition according to claim 1, wherein the thermoplastic polymer comprises a polymer matrix and scattering particles dispersed in said polymer matrix, wherein the scattering particles have a weight average particle diameter of from 0.01 μm to 100.0 μm, and a refractive index of the scattering particles differs from that of the polymer matrix by at least 0.01.

5. The thermoplastic moulding composition according to claim 1, wherein the thermoplastic polymer is polymethyl methacrylate and the thermoplastic moulding composition has a melt flow rate from 0.5 to 10.0 g/10 min, measured at 230° C. with a load of 3.8 kg.

6. A process for the manufacturing of the thermoplastic moulding composition according to claim 1, the process comprising:
   a) providing the thermoplastic polymer; and
   b) adding to the thermoplastic polymer from a) at least one colouring composition, comprising the carbon black and the monoazo dye.

7. The process according to claim 6, wherein the colouring composition is a liquid composition comprising:
   from 1.0 to 30.0 wt.-% of a dispersing additive,
   from 0.05 to 10.0 wt.-% of the carbon black,
   from 0.5 to 50.0 wt.-% of the monoazo dye,
   from 0.0 to 50.0 wt.-% of an auxiliary additive, and
   a liquid,
   wherein portions by weight of components add up to 100 wt.-%.

8. The process according to claim 6, wherein the colouring composition is a masterbatch comprising:
   from 0.01 to 40.0 wt.-% by weight of the monoazo dye,
   from 0.01 to 10.0 wt.-% by weight of the carbon black,
   from 50.0 to 99.98 wt.-% by weight of thermoplastic polymer, and
   from 0.0 to 10.0 wt.-% of an auxiliary additive.

9. The process according to claim 6, wherein the colouring composition comprises less than 100 ppm of aluminium or a compound thereof and less than 300 ppm of silicon or a compound thereof; and/or
   the colouring composition has a mass loss in dried form of not more than 15 wt.-% in isothermal thermogravimetric analysis at 260° C. for 60 min.

10. The process according to claim 6, wherein the b) is carried out in an extruder.

11. A process for the manufacturing of a moulded part, the process comprising:
    injection moulding the thermoplastic moulding composition according to claim 1, at a temperature ranging from 200° C. to 320° C., into a mould which can produce the moulded part.

12. A process for the manufacturing of an extruded part, the process comprising:
    extruding the thermoplastic moulding composition according to claim 1, at a temperature ranging from 200° C. to 320° C., wherein the thermoplastic moulding composition is melted and die-casted to the extruded part.

13. The process according to claim 11, wherein the moulded part has different wall thicknesses, one or more perforations, at least one non-planar surface, or a combination of these features.

14. A moulded part, obtained by the process according to claim 11.

15. A process for the manufacturing of the thermoplastic moulding composition according to claim 1,
    the process comprising:
    a) providing the thermoplastic polymer; and
    b) adding to the thermoplastic polymer from a) at least one colouring composition, comprising the carbon black and the monoazo dye, wherein said colouring composition is a liquid composition comprising:
       from 1.0 to 30.0 wt.-% of a dispersing additive, from 0.05 to 10.0 wt.-% of the carbon black,
from 0.5 to 50.0 wt.-% of the monoazo dye,
from 0.0 to 50.0 wt.-% of an auxiliary additive, and
a liquid,
wherein portions by weight of components add up to 100 wt.-%.

16. The process according to claim 7, wherein the liquid is demineralized water or an organic solvent.

17. The process according to claim 9, wherein the colouring composition comprises less than 50 ppm of the aluminium or compound thereof and less than 200 ppm of the silicon or compound thereof; and/or
wherein the colouring composition has a mass loss in dried form of from 0.0 to 10 wt.-% in isothermal thermogravimetric analysis at 260° C. for 60 min.

18. An extruded part, obtained by the process according to claim 12.

* * * * *